(12) United States Patent
Moriguchi et al.

(10) Patent No.: US 9,816,014 B2
(45) Date of Patent: *Nov. 14, 2017

(54) HOT MELT ADHESIVE FOR DISPOSABLE PRODUCTS

(71) Applicant: HENKEL AG & CO. KGAA, Duesseldorf (DE)

(72) Inventors: Masahiro Moriguchi, Osaka (JP); Shigekazu Saito, Osaka (JP); Kentarou Inoue, Osaka (JP); Takanori Okuda, Osaka (JP); Naohiro Maeda, Osaka (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 46 days.

This patent is subject to a terminal disclaimer.

(21) Appl. No.: 14/211,178

(22) Filed: Mar. 14, 2014

(65) Prior Publication Data

US 2014/0199907 A1   Jul. 17, 2014

Related U.S. Application Data

(63) Continuation of application No. PCT/JP2012/074135, filed on Sep. 13, 2012.

(30) Foreign Application Priority Data

Sep. 16, 2011   (JP) ................... 2011-203062

(51) Int. Cl.
| | |
|---|---|
| C09J 123/12 | (2006.01) |
| C08L 23/12 | (2006.01) |
| C09J 151/06 | (2006.01) |
| C08L 51/06 | (2006.01) |

(52) U.S. Cl.
CPC ............. *C09J 123/12* (2013.01); *C08L 23/12* (2013.01); *C08L 51/06* (2013.01); *C09J 151/06* (2013.01); *Y10T 428/2891* (2015.01); *Y10T 442/2738* (2015.04)

(58) Field of Classification Search
CPC ......... C08L 23/12; C08L 51/00; C09J 123/12; C09J 151/00
USPC .................... 428/343, 346; 442/58, 149, 150
See application file for complete search history.

(56) References Cited

U.S. PATENT DOCUMENTS

| | | | |
|---|---|---|---|
| 4,286,077 A | 8/1981 | St. Clair et al. | |
| 4,361,672 A | 11/1982 | Agarwal et al. | |
| 5,418,052 A | 5/1995 | Sugie et al. | |
| 6,099,900 A | 8/2000 | Minamizaki | |
| 6,184,285 B1 | 2/2001 | Hatfield et al. | |
| 6,627,723 B2 | 9/2003 | Karandinos et al. | |
| 6,747,114 B2 | 6/2004 | Karandinos et al. | |
| 6,887,941 B2 | 5/2005 | Zhou | |
| 7,459,503 B2 | 12/2008 | Kanamaru et al. | |
| 7,825,186 B2 | 11/2010 | Bach et al. | |
| 8,366,865 B2 * | 2/2013 | Terfloth et al. ............... | 156/325 |
| 8,604,145 B2 | 12/2013 | Boone et al. | |
| 8,653,169 B2 * | 2/2014 | Jiang et al. ................... | 524/274 |
| 2004/0039117 A1 | 2/2004 | Kijima | |
| 2005/0014891 A1 | 1/2005 | Quinn | |
| 2005/0059759 A1 | 3/2005 | Sajot et al. | |
| 2005/0159566 A1 | 7/2005 | Minami et al. | |
| 2007/0117907 A1 | 5/2007 | Bach et al. | |
| 2008/0081868 A1 | 4/2008 | Jiang et al. | |
| 2009/0110925 A1 | 4/2009 | Fukuda et al. | |
| 2010/0305259 A1 * | 12/2010 | Rodriguez et al. ........... | 524/504 |
| 2011/0021102 A1 | 1/2011 | Inoue et al. | |
| 2013/0296476 A1 | 11/2013 | Yasui et al. | |
| 2014/0199907 A1 | 7/2014 | Moriguchi et al. | |
| 2015/0017868 A1 | 1/2015 | Stafeil et al. | |

FOREIGN PATENT DOCUMENTS

| | | | | |
|---|---|---|---|---|
| EP | 0285430 | A2 | 10/1998 | |
| EP | 1498432 | A1 | 1/2005 | |
| EP | 1637559 | * | 3/2006 | ............. C08L 23/10 |
| EP | 1637559 | A1 | 3/2006 | |
| EP | 2113541 | A1 | 11/2009 | |
| EP | 2290029 | A1 | 3/2011 | |
| EP | 2081609 | B1 | 3/2012 | |
| EP | 1498434 | B1 | 10/2013 | |
| JP | 60120775 | A | 6/1985 | |
| JP | 4077591 | A | 3/1992 | |
| JP | 200196490 | A | 4/2001 | |
| JP | 2002519474 | A | 7/2002 | |
| JP | 2004137297 | A | 5/2004 | |
| JP | 2007169531 | A | 7/2007 | |
| JP | 2009242533 | A | 10/2009 | |
| JP | 2011511866 | A | 4/2011 | |
| JP | 2012187361 | A | 10/2012 | |
| WO | 0146278 | A2 | 6/2001 | |
| WO | 0153408 | A1 | 7/2001 | |
| WO | 0196490 | A | 12/2001 | |
| WO | 2006004750 | A1 | 1/2006 | |
| WO | 2012068576 | A2 | 5/2012 | |
| WO | 2012068703 | A1 | 5/2012 | |

* cited by examiner

*Primary Examiner* — Arti Singh-Pandey
(74) *Attorney, Agent, or Firm* — Sun Hee Lehmann

(57) ABSTRACT

The present invention provides a hot melt adhesive suitable for use in disposable products, which can be applied at a high speed and provides excellent in adhesion in a wet state and low-temperature coating, with little odor. The hot melt adhesive for disposable products comprises: (A) a propylene homopolymer having a melting point of 100° C. or lower obtained by polymerizing propylene using a metallocene catalyst; and (B) a wax modified with carboxylic acid and/or carboxylic acid anhydride. The wet adhesion of the hot melt adhesive is improved when the wax is modified with maleic acid and/or maleic anhydride.

14 Claims, No Drawings

HOT MELT ADHESIVE FOR DISPOSABLE PRODUCTS

FIELD OF THE INVENTION

The present invention relates to a hot melt adhesive, and more particularly to a hot melt adhesive which is used in the field of disposable products typified by a paper diaper and a napkin.

BACKGROUND OF THE INVENTION

There have widely been used, as a hot melt adhesive which is used in disposable products such as a diaper and a napkin and is also applied to a base material thereof, for example, a nonwoven fabric, a tissue, a polyethylene film and the like, a synthetic rubber-based hot melt adhesive containing a thermoplastic block copolymer as a main component In case of producing the disposable products, a film or a nonwoven fabric is coated with a hot melt adhesive, and high-speed coating is sometimes employed so as to enhance production efficiency of the disposable products. However, the synthetic rubber-based hot melt adhesive may be sometimes scattered when applied at a high speed.

One of means for enhancing the production efficiency of the disposable products includes a method in which an olefin-based hot melt adhesive typified by an ethylene-propylene copolymer is applied at a high speed.

JP 2001-96490 A and JP 2011-511866 A disclose that an olefin-based hot melt adhesive can be used in the disposable products. However, as is disclosed in JP 2001-96490 A and JP 2011-511866 A, the olefin-based hot melt adhesive is more suitable for use in paper processing than use in the disposable products.

JP 2001-96490 A discloses that a propylene polymer is used as a raw material for the hot melt adhesive. However, the hot melt adhesive in the same literature does not have sufficient wet adhesion to a tissue base material. A diaper, a sanitary napkin and the like often have a structure in which an absorber constituted by a pulp, an absorbent polymer and the like is wrapped in a tissue and the outside thereof is covered with a nonwoven fabric, a polyethylene film and the like. If the hot melt adhesive does not have sufficient wet adhesion, body fluid absorbency of the absorbent article may sometimes deteriorate by separation of adhesion between the tissues and by separation of adhesion between the tissue and the nonwoven fabric in a wet state.

As disclosed in the table of Examples, the hot melt adhesive of JP 2011-511866 A presupposes high viscosity and coating at about 170° C. to 180° C. Therefore, it is very difficult to coat a nonwoven fabric or a film with the hot melt adhesive of Patent Literature 2 in case of spiral coating at 160° C. or lower since the viscosity is too high.

Furthermore, not only the above-mentioned properties, but also little odor is required to the hot melt adhesive for disposable products.

OBJECT OF THE INVENTION

The present invention provides a hot melt adhesive. The hot melt adhesive according to the present invention is suitable for use in disposable products.

An object of the present invention is to provide a hot melt adhesive suitable for use in disposable products, which can be applied at a high speed and is excellent in adhesion in a wet state (hereinafter also referred to as "wet adhesion") and low-temperature coating, and also has little odor.

SUMMARY OF THE INVENTION

The present inventors have intensively studied and found that, when a propylene homopolymer having narrow molecular weight distribution and also having a low melting point is blended with an acid-modified wax, a hot melt adhesive, which is suitable for high-speed coating and is excellent in wet adhesion and low-temperature coating, and also has little odor, is obtained and the hot melt adhesive is suitable for use in disposable products, and thus the present invention has been completed.

That is, the present invention provides, in a first aspect, a hot melt adhesive for disposable products, including: (A) a propylene homopolymer having a melting point of 100° C. or lower obtained by polymerizing propylene using a metallocene catalyst; and (B) a wax modified with carboxylic acid and/or carboxylic acid anhydride.

The present invention provides, in an embodiment, the hot melt adhesive for disposable products, wherein the wax modified with carboxylic acid and/or carboxylic acid anhydride (B) is a polyolefin wax modified with maleic acid and/or maleic anhydride.

The present invention provides, in another embodiment, the hot melt adhesive for disposable products, wherein the melt viscosity of the hot melt adhesive at 150° C. is 5,000 mPa·s or less.

The present invention provides, in a preferred embodiment, the hot melt adhesive for disposable products, wherein the propylene homopolymer (A) contains: (A1) a propylene homopolymer having a weight average molecular weight of 60,000 or less; and (A2) a propylene homopolymer having a weight average molecular weight of more than 60,000.

The present invention provides, in still another embodiment, the hot melt adhesive for disposable products, wherein the amount of the propylene homopolymer (A1) is from 20 to 40 parts by weight and the amount of the propylene homopolymer (A2) is from 50 to 70 parts by weight, based on 100 parts by weight of the total weight of the propylene homopolymer (A) and the wax (B).

The present invention provides, in a preferred embodiment, the hot melt adhesive for disposable products, further including: (C) a tackifier resin, wherein the amount of the tackifier resin (C) is from 60 to 150 parts by weight based on 100 parts by weight of the total weight of the propylene homopolymer (A) and the wax (B).

The present invention provides, in most preferred embodiment, the hot melt adhesive for disposable products, which contains the wax (B) in the amount of 1 to 10 parts by weight based on 100 parts by weight of the total weight of the propylene homopolymer (A) and the wax (B).

The present invention provides, in a second aspect, disposable products obtainable by applying the above hot melt adhesive for disposable products.

DETAILED DESCRIPTION OF THE INVENTION

The hot melt adhesive for disposable products of the present invention is suitable for high-speed coating and is also excellent in wet adhesion and low-temperature coating since it includes: (A) a propylene homopolymer having a melting point of 100° C. or lower obtained by polymerizing propylene using a metallocene catalyst; and (B) a wax modified with carboxylic acid and/or carboxylic anhydride.

When the wax modified with carboxylic acid and/or carboxylic anhydride (B) is a polyolefin wax modified with maleic acid and/or maleic anhydride, the wet adhesion is more improved.

When the hot melt adhesive for disposable products of the present invention has the melt viscosity of 5,000 mPa·s or less of the adhesive at 150° C., the hot melt adhesive is further excellent in high-speed coating.

The hot melt adhesive for disposable products of the present invention is suitable for high-speed coating and is excellent in balance between wet adhesion and low-temperature coating when the propylene homopolymer (A) contains: (A1) a propylene homopolymer having a weight average molecular weight of 60,000 or less; and (A2) a propylene homopolymer having a weight average molecular weight of more than 60,000.

The hot melt adhesive for disposable products of the present invention is more suitable for high-speed coating and is excellent in balance between wet adhesion and low-temperature coating when the amount of the propylene homopolymer (A1) is from 20 to 40 parts by weight and the amount of the propylene homopolymer (A2) is from 50 to 70 parts by weight, based on 100 parts by weight of the total weight of the propylene homopolymer (A) and the wax (B).

The hot melt adhesive for disposable products of the present invention is easily applied to a nonwoven fabric even at a low temperature of 150° C. or lower and is more suitable for use in disposable products when it further includes: (C) a tackifier resin, and the amount of the tackifier resin (C) is from 60 to 150 parts by weight based on 100 parts by weight of the total weight of the propylene homopolymer (A) and the wax (B).

The hot melt adhesive for disposable products of the present invention is more suitable for a hot melt adhesive for disposable products since odor decreases while maintaining wet adhesion when the hot melt adhesive contains the wax (B) in the amount of 1 to 10 parts by weight based on 100 parts by weight of the total weight of the propylene homopolymer (A) and the wax (B).

The disposable products of the present invention are produced in a high-speed coating line with satisfactory efficiency since it is obtained by being coated with the above hot melt adhesive. Since the temperature of the coating line can reach a low temperature of about 150° C., high safety and high wet adhesion are achieved, and thus a nonwoven fabric and a tissue are not peeled off due to a body fluid or the like.

MODE FOR CARRYING OUT THE INVENTION

The hot melt adhesive for disposable products according to the present invention contains, as essential components, two components:
(A) a propylene homopolymer having a melting point of 100° C. or lower obtained by polymerizing propylene using a metallocene catalyst; and
(B) a wax modified with carboxylic acid and/or carboxylic acid anhydride.

In the present invention, the propylene homopolymer (A) refers to a homopolymer of propylene, which is produced by using a metallocene catalyst as a polymerization catalyst. The melting point of the propylene homopolymer (A) is 100° C. or lower, particularly preferably from 60 to 90° C., and most preferably from 65 to 85° C.

The melting point refers to a value measured by differential scanning calorimetry (DSC). Specifically, after weighing 10 mg of a sample in an aluminum container, the measurement is carried out at temperature rise rate of 5° C./minute using DSC6220 (trade name) manufactured by SII NanoTechnology Inc, and the temperature of a top of a fusion peak refers to the melting point.

When propylene is polymerized using a metallocene catalyst, a propylene homopolymer having (i) crystallinity and (ii) very narrow molecular weight distribution is synthesized.

The above (i) means that complete isotacticity and syndiotacticity can be arbitrarily controlled. Therefore, a polymer, which is uniform about arrangement, ratio and the like of methyl groups, is obtained without causing deviation of crystallinity and a low crystalline site that can cause decrease in adhesive force is less likely to be formed.

With respect to the above (ii), when the molecular weight distribution of the propylene homopolymer (A) is indicated by polydispersity (Mw/Mn), it is usually from 1.0 to 3.0. The propylene homopolymer having polydispersity of 1.0 to 3.0 is more excellent in low-temperature coating since the width of spiral coating increases. The molecular weight distribution is a concept which indicates distribution of a molecular weight of a synthetic polymer, and a ratio (Mw/Mn) of a weight average molecular weight (Mw) to a number average molecular weight (Mn) serves as an indicator. In the present invention, the molecular weight distribution is measured by gel permeation chromatography (GPC).

The propylene homopolymer (A) preferably contains: (A1) a propylene homopolymer having a weight average molecular weight of 60,000 or less; and (A2) a propylene homopolymer having a weight average molecular weight of more than 60,000.

In the present invention, the weight average molecular weight of the propylene homopolymer (A1) is preferably from 30,000 to 60,000, and more preferably from 30,000 to 55,000.

In the present invention, the weight average molecular weight of the propylene homopolymer (A2) is preferably more than 60,000 and 90,000 or less, and more preferably more than 60,000 and 80,000 or less.

Examples of a commercially available product of the propylene homopolymer (A1) include L-MODU X400S manufactured by Idemitsu Kosan Co., Ltd., and examples of a commercially available product of the propylene homopolymer (A2) include L-MODU X600S manufactured by Idemitsu Kosan Co., Ltd.

The weight average molecular weight (Mw) means a value measured by gel permeation chromatography (GPC). Specifically, the value can be measured by using the following apparatus and measuring method. RI manufactured by Waters Corporation is used as a detector. TSKGEL GMHHR-H(S) HT manufactured by TOSOH CORPORATION is used as a GPC column. A sample is dissolved in 1,2,4-trichlorobenzene and allowed to flow at a flow rate of 1.0 ml/min and a measuring temperature of 145° C., and then the weight average molecular weight is determined by conversion of a molecular weight using a calibration curve derived from polypropylene.

Since a number average molecular weight (Mn) is also determined by the same method, the molecular weight distribution is also calculated by GPC.

The amount of the propylene homopolymer (A1) contained is preferably from 20 to 40 parts by weight, and more preferably 25 to 35 parts by weight, based on 100 parts by weight of the total weight of the components (A) and (B). The amount of the propylene homopolymer (A2) contained is preferably from 50 to 70 parts by weight, and more preferably 55 to 70 parts by weight, based on 100 parts by weight of the total weight of the components (A) and (B).

By blending the propylene homopolymer (A1) and the propylene homopolymer (A2) in the above amount, the hot melt adhesive for disposable products of the present invention is excellent in comprehensive balance among high-speed coatability, wet adhesion, low-temperature coating and deodorization property.

There is no particular limitation on the wax (B) as long as it is modified with carboxylic acid and/or carboxylic anhydride, and the objective hot melt adhesive of the present invention can be obtained. When hydrophilic natural sheet such as a tissue or cotton is adhered with the hot melt adhesive containing the wax (B) modified with carboxylic acid and/or carboxylic anhydride, the wax (B) can improve wet adhesion remarkably effectively, and thus prevent a tissue or nonwoven fabric wetted with a body fluid from peeling.

Examples of the wax (B) include:
a wax obtained by graft polymerization of carboxylic acid and/or carboxylic anhydride with a base wax, and
a wax obtained by copolymerization of carboxylic acid and/or carboxylic anhydride in case of synthesizing the wax by polymerization.

Therefore, the wax may also be modified as a result of introduction of carboxylic acid and/or carboxylic anhydride using various reactions.

There is no particular limitation on the above "base wax" as long as it is a wax to be commonly used in a hot melt adhesive and the objective hot melt adhesive of the present invention can be obtained. Specific examples thereof include synthetic waxes such as a Fischer-Tropsch wax and a polyolefin wax (polyethylene wax, polypropylene wax); petroleum waxes such as a paraffin wax and a microcrystalline wax; and natural waxes such as a castor wax.

There is no particular limitation on the carboxylic acid and/or carboxylic anhydride to be used to modify the base wax as long as the objective hot melt adhesive of the present invention can be obtained. Specific examples thereof include maleic acid, maleic anhydride, fumaric acid, succinic acid, succinic anhydride, phthalic acid, phthalic anhydride, glutaric acid, glutaric anhydride, itaconic acid, acrylic acid, methacrylic acid and the like. These carboxylic acids and/or carboxylic anhydrides may be used alone, or in combination. In the present invention, maleic acid and maleic anhydride are particularly preferable.

It is possible to use, as a substance which modifies the base wax, various carboxylic acid derivatives which can introduce polar groups (i.e., carboxylic acid group and/or carboxylic anhydride group). Herein, "carboxylic acid derivatives" include:
carboxylic acid esters such as ethyl acetate and vinyl acetate;
acid halides such as benzoyl bromide;
amides such as benzamide, N-methylacetamide and N,N-dimethylformamide;
imides such as succinimide;
acyl azides such as acetyl azide;
hydrazides such as propanoyl hydrazide;
hydroxamic acids such as chloroacetylhydroxamic acid;
lactones such as γ-butyrolactone; and
lactams such as δ-caprolactam.

The wax modified with carboxylic acid and/or carboxylic anhydride (B) of the present invention is preferably a polyolefin wax modified with maleic acid and/or maleic anhydride, and particularly preferably a polypropylene wax modified with maleic anhydride.

It is possible to use, as (B) the wax modified with carboxylic acid and/or carboxylic anhydride, commercially available products. Examples thereof include Licosene PP MA6252 (trade name) manufactured by Clariant International Ltd., Hiwax 2203A manufactured by Mitsui Chemicals, Inc. and CERAMER 1608 (trade name) manufactured by Toyo Petrolite Co., Ltd.

In the present invention, the blending amount of the wax (B) is preferably from 1 to 10 parts by weight based on 100 parts by weight of the total weight of the components (A) and (B). By blending the wax (B) in the above amount, the obtained hot melt adhesive has little odor while maintaining wet adhesion.

It is preferred that the hot melt adhesive for disposable products of the present invention further includes (C) a tackifier resin.

The tackifier resin (C) is preferably blended in the amount within a range from 60 to 150 parts by weight, more preferably from 100 to 150 parts by weight, and particularly preferably from 100 to 130 parts by weight, based on 100 parts by weight of the total weight of the propylene homopolymer (A) and the wax (B).

By blending the tackifier resin (C) in the above amount, the obtained hot melt adhesive is suitable for low-temperature coating at 150° C. or lower and also it becomes possible to be uniformly applied to a nonwoven fabric, and thus the adhesive is suitable for the production of disposable products.

Examples of the tackifier resin (C) include a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a terpolymer of a natural terpene, hydrogenated derivatives of a copolymer of a hydrogenated terpene, a polyterpene resin, hydrogenated derivatives of a phenol-based modified terpene resin, an aliphatic petroleum hydrocarbon resin, hydrogenated derivatives of an aliphatic petroleum hydrocarbon resin, an aromatic petroleum hydrocarbon resin, hydrogenated derivatives of an aromatic petroleum hydrocarbon resin, a cyclic aliphatic petroleum hydrocarbon resin, and hydrogenated derivatives of a cyclic aliphatic petroleum hydrocarbon resin. These tackifier resins can be used alone, or in combination. It is also possible to use, as the tackifier resin, a liquid type tackifier resin as long as it has a colorless to pale yellow color tone and substantially no odor, and also has satisfactory thermal stability. Taking these properties into consideration comprehensively, the tackifier resin is preferably hydrogenated derivatives of resins, and particularly preferably a hydrogenated dicyclopentadiene-based resin.

It is possible to use, as the tackifier resin (C), commercially available products. Examples of these commercially available products include Alcon P100 (trade name) and Alcon M115 (trade name) manufactured by Arakawa Chemical Industries, Ltd., Clearon P135 (trade name) manufactured by YASUHARA CHEMICAL CO., LTD., and ECR5400 (trade name) manufactured by Exxon Corporation. These commercially available tackifier resins can be used alone, or in combination.

The hot melt adhesive of the present invention can further include oil (D). The oil (D) is blended as a plasticizer for the purpose of decrease in melt viscosity of the hot melt adhesive, imparting of flexibility and improvement in wettability to an adherend. Examples of the oil (D) include paraffin oil, naphthene oil and aromatic oil, and colorless and odorless oils such as naphthene oil and paraffin oil are particularly preferable.

It is possible to use, as the oil (D), commercially available products. Examples thereof include Diana Fresia S32 (trade name), Diana Process Oil PW-90 (trade name) and Process Oil NS100 (trade name) manufactured by Idemitsu Kosan Co., Ltd., White Oil Broom 350 (trade name) and DN oil KP-68 (trade name) manufactured by Kukdong Oil & Chemical Co., Ltd., Enerper M1930 (trade name) manufactured by BP Chemicals Ltd, Kaydol (trade name) manufactured by Crompton Corporation, Primol 352 (trade name) manufactured by Esso Corp., and KN4010 (trade name) manufactured by PetroChina Company. These oils (D) can be used alone, or in combination.

If necessary, the hot melt adhesive according to the present invention may further contain various additives. Examples of the various additives include a stabilizer and a fine particle filler.

The "stabilizer" is blended so as to improve stability of the hot melt adhesive by preventing decrease in molecular weight, gelation, coloration, and generation of odor of the hot melt adhesive due to heat, and there is no particular limitation on the stabilizer as long as the objective hot melt adhesive of the present invention can be obtained. Examples of the "stabilizer" include an antioxidant and an ultraviolet absorber.

The "ultraviolet absorber" is used so as to improve light resistance of the hot melt adhesive. The "antioxidant" is used so as to prevent oxidation degradation of the hot melt adhesive. The antioxidant and ultraviolet absorber are commonly used in disposable products and can be used without particular limitation as long as the below-mentioned objective disposable products can be obtained.

Examples of the antioxidant include a phenol-based antioxidant, a sulfur-based antioxidant and a phosphorus-based antioxidant. Examples of the ultraviolet absorber include a benzotriazole-based ultraviolet absorber and a benzophenone-based ultraviolet absorber. It is also possible to add a lactone-based stabilizer. These additives can be used alone, or in combination.

It is possible to use, as the stabilizer, commercially available products. Examples thereof include SUMILIZER GM (trade name), SUMILIZER TPD (trade name) and SUMILIZER TPS (trade name) manufactured by Sumitomo Chemical Co. Ltd.; IRGANOX 1010 (trade name), IRGANOX HP2225FF (trade name), IRGAFOS 168 (trade name) and IRGANOX 1520 (trade name) manufactured by Ciba Specialty Chemicals Inc.; and JF77 (trade name) manufactured by Johoku Chemical Co., Ltd. These stabilizers can be used alone, or in combination.

The hot melt adhesive for disposable products of the present invention can further include a fine particle filler. Commomly used fine particle filler may be used, and there is no particular limitation as long as the objective hot melt adhesive of the present invention can be obtained. Examples, of the "fine particle filler" include mica, calcium carbonate, kaolin, talc, titanium oxide, diatomaceous earth, urea-based resin, styrene beads, calcined clay, starch and the like. These particles preferably have a spherical shape, and there is no particular limitation on the size (diameter in case of a spherical shape).

The hot melt adhesive for disposable products of the present invention can be produced by blending the component (A) and the component (B), blending optionally the components (C) and/or the component (D), if necessary adding the various additives, and melting the mixture with heating, followed by mixing. Specifically, the hot melt adhesive can be produced by charging the above components in a melt-mixing vessel equipped with a stirrer, followed by heating and mixing.

In the hot melt adhesive for disposable products according to the present invention, the melt viscosity at 150° C. is 5,000 mPa·s or less, preferably from 1,500 to 3,500 mPa·s, and particularly preferably from 1,800 to 3,000 mPa·s. The "melt viscosity" is viscosity of the hot melt adhesive which is molten, and is measured by a Brookfield RVT-type viscometer (spindle No. 27).

By controlling the melt viscosity within the above range, the hot melt adhesive is suitable for low-temperature coating. Furthermore, since a nonwoven fabric is uniformly coated and the hot melt adhesive is likely to permeate, thus the adhesive is suitable for disposable products.

As mentioned above, the hot melt adhesive according to the present invention can also be employed in paper processing, bookbinding, disposable products and the like, and it has been developed for disposable products since it is excellent in adhesion in a wet state. The disposable products can be constituted by coating at least one kind of member selected from a group consisting of a woven fabric, a nonwoven fabric, a rubber, a resin, papers and a polyolefin film with the hot melt adhesive according to the present invention. The polyolefin film is preferably a polyethylene film for the reason of durability, costs and the like.

There is no particular limitation on the disposable products as long as they are so-called sanitary materials. Specific examples thereof include a paper diaper, a sanitary napkin, a pet sheet, a hospital gown, a surgical white garment and the like.

In the production line of the disposable products, various members (for example, tissue, cotton, nonwoven fabric, polyolefin film, etc.) of the disposable products are commonly coated with the hot melt adhesive. In case of coating, the hot melt adhesive may be discharged (or ejected) from various dischargers (or ejectors).

There is no particular limitation on the method of coating with the hot melt adhesive as long as the objective disposable products can be obtained. Such a coating method is roughly classified into a contact coating method and a non-contact coating method. The "contact coating" method refers to a coating method in which a discharger is brought into contact with a member or a film in case of coating with the hot melt adhesive, while the "non-contact coating" method refers to a coating method in which a discharger is not brought into contact with a member or a film in case of coating with the hot melt adhesive. Examples of the contact coating method include a slot coater coating method, a roll coater coating method and the like, and examples of the non-contact coating method include a spiral coating capable of coating in a spiral form, an omega coating or control seam coating method capable of coating in a wavy form, a slot spray coating or curtain spray coating method capable of coating in a plane form, and dot coating capable of coating in a dot form.

The hot melt adhesive of the present invention is suitable for the spiral coating. The spiral coating method is a method in which an adhesive is applied without contact in a spiral form by intermittent or continuous application.

It is extremely useful for the production of disposable products that the hot melt adhesive can be applied in a wide width by the spray coating. The hot melt adhesive capable of being applied widely is capable of decreasing a coating width by adjusting pressure of hot air.

When it is difficult to apply the hot melt adhesive widely, a lot of spray nozzles for obtaining sufficient bonding area are needed, and thus it is unsuitable for the production of relatively small disposable products such as a urine collection liner, and disposable products having a complicated shape.

Therefore, the hot melt adhesive of the present invention is suitable for the disposable products since the spiral coating can be performed widely (or in a wide width).

The hot melt adhesive of the present invention is useful for the production of the disposable products because of satisfactory coatability at 150° C. or lower. In case of coating with the hot melt adhesive at a high temperature, since a polyolefin (preferably, polyethylene) film as a base material of the disposable products may be melted and shrink thermally, the appearance of the disposable products is drastically impaired. In case of applying the hot melt adhesive at 150° C. or lower, the appearance of the polyolefin (preferably, polyethylene) film and a nonwoven fabric as a base material of the disposable products scarcely change, and thus the appearance of the products is not impaired.

The hot melt adhesive of the present invention is suitable for the production of the disposable products within a short time since it is excellent in high-speed coatability. When the base material to be transported at a high speed is coated with the hot melt adhesive, breakage of the base material due to friction may sometimes arise in the contact type coating method. The hot melt adhesive of the present invention is suitable for the spiral coating as a kind of non-contact coating and is therefore suited for high-speed coating, and thus it is possible to improve production efficiency of the disposable products. Furthermore, the hot melt adhesive of the present invention suited for high-speed coating does not cause disorder of the coating pattern.

The hot melt adhesive of the present invention has satisfactory thermal stability and is uniformly melted in a high-temperature tank at from 100 to 200° C. and does not cause phase separation. A hot melt adhesive having poor thermal stability easily cause phase separation of components in the high-temperature tank. The phase separation can cause clogging of a tank filter and a transfer piping.

Main embodiments of the present invention are shown below.

1. A hot melt adhesive for disposable products, including: (A) a propylene homopolymer having a melting point of 100° C. or lower obtained by polymerizing propylene using a metallocene catalyst; and (B) a wax modified with carboxylic acid and/or carboxylic acid anhydride.

2. The hot melt adhesive for disposable products according to the above 1, wherein the wax modified with carboxylic acid and/or carboxylic acid anhydride (B) is a polyolefin wax modified with maleic acid and/or maleic anhydride.

3. The hot melt adhesive for disposable products according to the above 1 or 2, wherein the melt viscosity of the hot melt adhesive at 150° C. is 5,000 mPa·s or less.

4. The hot melt adhesive for disposable products according to any one of the above 1 to 3, wherein the propylene homopolymer (A) contains: (A1) a propylene homopolymer having a weight average molecular weight of 60,000 or less; and (A2) a propylene homopolymer having a weight average molecular weight of more than 60,000.

5. The hot melt adhesive for disposable products according to any one of the above 1 to 4, wherein the amount of the propylene homopolymer (A1) is from 20 to 40 parts by weight and the amount of the propylene homopolymer (A2) is from 50 to 70 parts by weight, based on 100 parts by weight of the total weight of the propylene homopolymer (A) and the wax (B).

6. The hot melt adhesive for disposable products according to any one of the above 1 to 5, further including: (C) a tackifier resin, wherein the amount of the tackifier resin (C) is from 60 to 150 parts by weight based on 100 parts by weight of the total weight of the propylene homopolymer (A) and the wax (B).

7. The hot melt adhesive for disposable products according to the above 6, which contains the wax (B) in the amount of 1 to 10 parts by weight based on 100 parts by weight of the total weight of the propylene homopolymer (A) and the wax (B).

8. Disposable products obtainable by applying the hot melt adhesive for disposable products according to any one of the above 1 to 7.

EXAMPLES

The present invention will be described for the purpose of describing the present invention in more detailed and specific manner by way of Examples. These are exemplary of the present invention and are not to be considered as limiting.

Components for preparing a hot melt adhesive are shown below.

(A) Propylene homopolymer having a melting point of 100° C. or lower which is obtained by polymerization with a metallocene catalyst.

(A1) Crystalline propylene homopolymer (L-MODU X400S (trade name), manufactured by Idemitsu Kosan Co., Ltd., having a melting point of 75° C. and a weight average molecular weight of 45,000)

(A2) Crystalline propylene homopolymer (L-MODU X600S (trade name), manufactured by Idemitsu Kosan Co., Ltd., having a melting point of 80° C. and a weight average molecular weight of 70,000)

(A'3) Crystalline propylene homopolymer (Licocene PP6102 (trade name), manufactured by Clariant (Japan) K.K., having a melting point of 145° C.)

(A'4) Crystalline ethylene/propylene copolymer (Licocene PP2602 (trade name), manufactured by Clariant (Japan) K.K., having a melting point of 145° C.)

(A'5) Amorphous ethylenepropylene copolymer (Vestoplast 828 (trade name), manufactured by Evonik Degussa Japan Co., Ltd.)

(A'6) Crystalline ethylene/octene copolymer (Affinity GA1950 (trade name), manufactured by Dow Chemical Company, having a melting point of 100° C.)

(B) Wax modified with carboxylic acid and/or carboxylic anhydride (B1) Maleic acid-modified wax (Licocene PP MA6252 (trade name), manufactured by Clariant (Japan) K.K.)

(B2) Maleic acid-modified wax (Hiwax 2203A (trade name), manufactured by Mitsui Chemicals, Inc.)

(B3) Maleic acid-modified wax (AC597 (trade name), manufactured by Honeywell International Inc.)

(B'4) Polypropylene wax (Hiwax NP105 (trade name), manufactured by Mitsui Chemicals, Inc.)

(C) Tackifier resin (C1) Hydrogenated aliphatic tackifire resin (Alcon-P100 (trade name), manufactured by Arakawa Chemical Industries, Ltd.)

(C2) Hydrogenated aliphatic tackifier resin (Alcon-M115 (trade name), manufactured by Arakawa Chemical Industries, Ltd.)

(C3) Hydrogenated terpene-based tackifier resin (Clearon P135 (trade name), manufactured by YASUHARA CHEMICAL CO., LTD.)

(C4) Hydrogenated dicyclopentadiene-based tackifier resin (ECR5400 (trade name), manufactured by Exxon Mobil Corporation)

(D) Oil (D1) Naphthene oil (Process Oil NS100 (trade name), manufactured by Idemitsu Kosan Co., Ltd.)

(D2) Naphthene oil (Nyflex 222B (trade name), manufactured by Nynas Co.)

(D3) Paraffin oil (Diana Fresia S32 (trade name), manufactured by Idemitsu Kosan Co., Ltd.)

(D4) Paraffin oil (Diana Process Oil PW90 (trade name), manufactured by Idemitsu Kosan Co., Ltd.)

(E) Antioxidant (E1) Phenol-based antioxidant (Adekastab AO60 (trade name), manufactured by ADEKA Corporation)

(F) Styrene block copolymer (F1) Styrene-isoprene-styrene block copolymer (VECTOR 4211 (trade name), manufactured by Dexco Polymers)

These components were blended (or formulated) according to the compositions shown in Tables 1 and 2, and then melt-mixed at 150° C. over 2 hours using a universal stirrer to prepare hot melt adhesives of Examples 1 to 10 and Comparative Examples 1 to 7.

With respect to the above-mentioned hot melt adhesives, melt viscosity, peel strength, coatability and odor were evaluated. Summary of the respective evaluations is described below.

<Melt Viscosity (mPa·s)>

A hot melt adhesive was melted at 150° C. and, after 30 minutes, the viscosity was measured by a No. 27 rotor using a Brookfield viscometer. The evaluation criteria are as follows:

A: from 1,000 mPa·s to 3,000 mPa·s.
B: 500 mPa·s or more and less than 1,000 mPa·s, or more than 3,000 mPa·s and less than 10,000 mPa·s.
C: less than 500 mPa·s or 10,000 mPa·s or more.

<Peel Strength Test>

(Production of Samples)

A nonwoven fabric was coated with a hot melt adhesive in a coating amount of 3 g/m$^2$. The coating was performed at a temperature of 150° C. by a spiral spray. The nonwoven fabric coated with the hot melt adhesive and a tissue were laid one upon another through the hot melt adhesive, followed by pressing under a pressure of 0.5 kgf/cm to obtain samples (nonwoven fabric/tissue).

(Test Procedure)

Each of the samples was cut into 25 mm in a direction vertical to the direction of movement of a base material (CD direction), and then the peel strength was measured by T type peeling using a universal tensile testing machine (manufactured by JT Toshi Inc.). Regarding the peel strength, the measurement was performed in both dry and wet states.

In the measurement of the peel strength in a dry state (dry strength), the sample was used as it is without being wetted. In the measurement of the peel strength in a wet state (wet strength), the sample was dipped in tap water controlled to 20° C. for 5 to 6 seconds. After slightly wiping off moisture by a tissue, the sample was allowed to stand for about 1 minute and used.

The measurement was performed by the universal tensile testing machine under an environment of 20° C., 65% Rh and a peeling rate of 100 mm/minute.

Samples (Nonwoven fabric/Tissue)

Dry Strength

A: Breakage of tissue.
B: Average peel strength is from 30 to 60 (g/25 mm).
D: Average peel strength is less than 30 (g/25 mm).

Wet Strength

A: Breakage of tissue (peel strength at breakage is 35 g/25 mm or more).
B: Breakage of tissue (peel strength at breakage is less than 35 g/25 mm).
C: Average peel strength is from 10 to 30 (g/25 mm).
D: Average peel strength is less than 10 (g/25 mm).

<Coatability>

After setting at a coating temperature of 150° C. and a discharge amount of 20 g/min, a spiral spray (manufactured by Nordson Corporation) was mounted at a position (height of 35 mm from a polyethylene terephthalate (PET) film as a coating base material) and then the PET film was coated with a hot melt adhesive at a line speed of 200 m/min.

Furthermore, another PET film was used as a laminating base material, and a laminate of the coating base material and the laminating base material (PET film/PET film) was produced and then coatability was evaluated. The evaluation methods are shown below.

Spiral Coatability

Spiral coatability was evaluated by a spiral width of a hot melt adhesive applied by the spiral spray under an air pressure of 0.30 kgf/cm$^2$.

A: Spiral width of 18 to 20 mm is obtained.
B: Spiral width of 16 mm or more and less than 18 mm is obtained. Alternatively, spiral width of more than 20 mm and less than 23 mm is obtained.
D: Spiral width of less than 16 mm or 23 mm or more is obtained.

Suitability for High-Speed Coating Line

The air pressure of the spiral spray was increased to 0.36 kgf/cm$^2$ and high speed line coatability was evaluated by a spiral width of a hot melt adhesive used for coating.

A: Spiral width of 18 to 20 mm is obtained.
B: Spiral width of 16 mm or more and less than 18 mm is obtained. Alternatively, spiral width of more than 20 mm and less than 23 mm is obtained.
D: Spiral width of less than 16 mm or 23 mm or more is obtained.

<Evaluation of Odor>

In a 70 ml of glass bottle, 35 g of a hot melt adhesive was charged and left to stand under an atmosphere at 160° C. for 1 day, and then odor of the hot melt adhesive was judged by sensory evaluation.

A: Odor is scarcely recognized.
B: Unpleasant odor is slightly recognized.
D: Unpleasant odor is clearly recognized.

TABLE 1

| | | Examples | | | | | | | | | |
| --- | --- | --- | --- | --- | --- | --- | --- | --- | --- | --- | --- |
| | | 1 | 2 | 3 | 4 | 5 | 6 | 7 | 8 | 9 | 10 |
| (A) | (A1) | 97 | | 32 | 33 | 30 | 28 | 41 | 32 | 77 | |
| | (A2) | | 95 | 63 | 66 | 61 | 55 | 55 | 63 | 19 | 94 |

TABLE 1-continued

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| (B) | (B1) | 3 | 5 | 5 | 1 | 9 | 17 | 4 |  | 4 | 6 |
|  | (B2) |  |  |  |  |  |  |  | 5 |  |  |
| Total of (A) and (B) (Parts by weight) |  | 100 | 100 | 100 | 100 | 100 | 100 | 100 | 100 | 100 | 100 |
| (C) | (C1) |  | 60 |  |  |  |  |  |  |  |  |
|  | (C2) |  |  |  |  |  |  |  |  |  |  |
|  | (C3) |  |  |  |  |  |  | 25 |  |  | 147 |
|  | (C4) | 66 | 63 | 124 | 128 | 118 | 108 | 82 | 124 | 65 |  |
| (D) | (D1) |  | 63 | 95 | 98 | 91 | 83 | 69 | 95 |  |  |
|  | (D2) |  |  |  |  |  |  |  |  |  |  |
|  | (D3) | 29 |  |  |  |  |  |  |  | 19 | 132 |
|  | (D4) |  | 32 |  |  |  |  |  |  | 10 |  |
| (E) | (E1) | 2 | 3 | 3 | 3 | 3 | 3 | 3 | 3 | 2 | 4 |
| Viscosity at 150° C. (mPa · s) |  | 3,150 | 2,650 | 1,950 | 1,900 | 1,890 | 1,680 | 2,950 | 1,820 | 4,750 | 1,100 |
| Coatability 1) |  | A | A | A | A | A | A | A | A | B | A |
|  |  | A | A | A | A | A | A | A | A | A | B |
| Adhesive strength 2) |  | A | A | A | A | A | A | A | A | A | 31 B |
|  |  | 30 | 33 | 41 | 51 | 38 | 40 | 32 | 37 | 26 | 56 |
|  |  | B | B | A | A | A | A | B | A | B | A |
| Evaluation of odor |  | A | A | A | A | A | B | A | A | A | A |

1) Hot air pressure is 0.30 kgf/cm² in the upper column, while hot air pressure is 0.36 kgf/cm² in the lower column.
2) Adhesive strength is dry strength in the upper column and symbol "A" denotes breakage of tissue, while adhesive strength is wet strength in the lower column.

TABLE 2

|  |  | Comparative Examples | | | | | | |
|---|---|---|---|---|---|---|---|---|
|  |  | 1 | 2 | 3 | 4 | 5 | 6 | 7 |
| (A) | (A1) |  | 97 | 100 | 89 |  |  |  |
|  | (A2) |  |  |  | 11 |  |  |  |
|  | (A'3) | 97 |  |  |  | 18 |  |  |
|  | (A'4) |  |  |  |  | 24 |  |  |
|  | (A5') |  |  |  |  | 50 |  |  |
|  | (A6') |  |  |  |  |  | 97 |  |
| (B) | (B1) | 3 |  |  |  |  | 3 |  |
|  | (B2) |  |  |  |  |  |  |  |
|  | (B3) |  |  |  |  | 8 |  |  |
|  | (B4') |  | 3 |  |  |  |  |  |
| Total of (A) and (B) (Parts by weight) |  | 100 | 100 | 100 | 100 | 100 | 100 | 0 |
| (C) | (C1) |  |  |  |  | 67 |  |  |
|  | (C2) |  |  |  |  |  |  | 59.6 |
|  | (C3) |  |  |  |  |  |  |  |
|  | (C4) | 66 | 66 | 68 | 87 |  | 66 |  |
| (D) | (D1) | 29 |  |  | 33 |  | 29 |  |
|  | (D2) |  |  |  |  |  |  | 22 |
|  | (D3) |  | 29 | 30 |  |  |  |  |
|  | (D4) |  |  |  |  |  |  |  |
| (E) | (E1) | 2 | 2 | 2 | 2 | 1 | 2 | 0.5 |
| (F) | (F1) |  |  |  |  |  |  | 17.9 |
| Viscosity at 150° C. (mPa · s) |  | 92 | 3,300 | 3,100 | 4,100 | 25,200 | 5,100 | 2,600 |
| Coatability 1) |  | D | A | A | A | D | D | A |
|  |  | D | A | A | A | D | A | B |
| Adhesive strength 2) |  | Impossible to apply | 38 B | 60 B | A | Impossible to apply | 51 B | A |
|  |  | Impossible to apply | 4 D | 6 D | 7 D | Impossible to apply | 35 A | 2 D |
| Odor test |  | B | A | A | A | D | B | B |

1) Hot air pressure is 0.30 kgf/cm² in the upper column, while hot air pressure is 0.36 kgf/cm² in the lower column.
2) Adhesive strength is dry strength in the upper column and symbol "A" denotes breakage of tissue, while adhesive strength is wet strength in the lower column.

As shown in Table 1, the hot melt adhesives of Examples 1 to 10 are suitable for spiral coating at a low temperature since they have a low melt viscosity at 150° C., and it becomes possible to perform high-speed coating since appropriate spiral width is obtained under a high hot air pressure. The peel strength between a nonwoven fabric and a tissue is excellent in both dry and wet states. Moreover, it was proved the hot melt adhesives of Examples 1 to 10 are suitable for use in disposable products such as a diaper and sanitary products, as typical nonwoven fabric products, since they have little odor.

As shown in Table 2, the hot melt adhesives of Comparative Examples 1 to 7 are inferior in any one of evaluations of melt viscosity, high-speed coating, spiral coating, peel strength and odor as compared with the adhesives of Examples 1 to 10. It was shown that the hot melt adhesives of Examples 1 to 10 are more suitable for use in disposable products as compared with the hot melt adhesives of Comparative Examples 1 to 7.

The invention claimed is:

1. A hot melt adhesive for disposable products, comprising:
 (A) a propylene homopolymer having a melting point of 100° C. or lower prepared by polymerizing propylene with a metallocene catalyst;
 (B) a wax modified with carboxylic acid and/or carboxylic acid anhydride and
 (C) a tackifier resin;
 wherein the wax (B) is present in the amount of 1 to 10 parts by weight based on 100 parts by weight of the total weight of the components (A) and (B); and
 wherein the tackfier resin is present at 60 to 150 parts by weight based on 100 parts by weight of the total weight of the propylene homopolymer and the wax.

2. The hot melt adhesive for disposable products according to claim 1, wherein the propylene homopolymer has a melting point of 60° C. to 90° C.

3. The hot melt adhesive for disposable products according to claim 1, wherein the propylene homopolymer has a melting point of 65° C. to 85° C.

4. A hot melt adhesive for disposable products, comprising:
 (A) a propylene homopolymer having a melting point of 60° C. to 90° C. prepared by polymerizing propylene with a metallocene catalyst, wherein the propylene homopolymer consists of 20 to 40 parts by weight of (A1) a propylene homopolymer having a weight average molecular weight of 60,000 or less and 50 to 70 parts by weight and (A2) a propylene homopolymer having a weight average molecular weight of greater than 60,000;
 (B) a wax modified with carboxylic acid and/or carboxylic acid anhydride and
 (C) a tackifier resin;
 wherein the wax (B) is present in the amount of 1 to 10 parts by weight based on 100 parts by weight of the total weight of the components (A) and (B); and
 wherein the tackfier resin is present at 60 to 150 parts by weight based on 100 parts by weight of the total weight of the propylene homopolymer and the wax.

5. The hot melt adhesive for disposable products according to claim 4, wherein the (A1) propylene homopolymer has a weight average molecular weight of 30,000 to 55,000 and the (A2) propylene homopolymer has a weight average molecular weight of greater than 60,000 to 90,000.

6. The hot melt adhesive for disposable products according to claim 1, wherein the wax is a polyolefin wax modified with maleic acid and/or maleic anhydride.

7. The hot melt adhesive for disposable products according to claim 6, wherein the tackifier is a hydrogenated dicyclopentadiene-based resin.

8. The hot melt adhesive for disposable products according to claim 1, further comprising a (D) plasticizer.

9. The hot melt adhesive for disposable products according to claim 1, further comprising a stabilizer, filler, ultraviolet absorber, and mixtures thereof.

10. The hot melt adhesive for disposable products according to claim 1, wherein the melt viscosity of the hot melt adhesive at 150° C. is 5,000 mPa·s or less.

11. An article comprising the hot melt adhesive for disposable products of claim 1.

12. The article of claim 11 which is a paper diaper, sanitary napkin, pet sheet, hospital gown, or surgical garment.

13. The article of claim 12 comprising a substrate selected from the group consisting of tissue, cotton, nonwoven fabric and polyolefin film.

14. A hot melt adhesive for disposable products, consisting essentially of:
 (A) a propylene homopolymer having a melting point of 100° C. or lower prepared by polymerizing propylene with a metallocene catalyst;
 (B) a wax modified with carboxylic acid and/or carboxylic acid anhydride;
 (C) a tackifier; and
 (D) optionally, a plasticizer and/or a stabilizer
 wherein the wax (B) is present in the amount of 1 to 10 parts by weight based on 100 parts by weight of the total weight of the components (A) and (B); and
 wherein the tackfier resin is present at 60 to 150 parts by weight based on 100 parts by weight of the total weight of the propylene homopolymer and the wax.

* * * * *

UNITED STATES PATENT AND TRADEMARK OFFICE
CERTIFICATE OF CORRECTION

PATENT NO. : 9,816,014 B2  
APPLICATION NO. : 14/211178  
DATED : November 14, 2017  
INVENTOR(S) : Masahiro Moriguchi et al.

It is certified that error appears in the above-identified patent and that said Letters Patent is hereby corrected as shown below:

In the Specification

Column 7, Line 54: Change "Commomly" to -- Commonly --.

Column 10, Line 59: Change "tackifire" to -- tackifier --.

In the Claims

Column 15, Line 24: Change "tackfier" to -- tackifier --.

Column 16, Line 1: Change "tackfier" to -- tackifier --.

Column 16, Line 46: Change "tackfier" to -- tackifier --.

Signed and Sealed this  
Twenty-second Day of May, 2018

Andrei Iancu  
*Director of the United States Patent and Trademark Office*